US010414212B2

(12) United States Patent
Bonnamour et al.

(10) Patent No.: US 10,414,212 B2
(45) Date of Patent: Sep. 17, 2019

(54) TREAD COMPRISING A BLOCK HAVING A PLURALITY OF SIPES

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Matthieu Bonnamour, Clermont-Ferrand (FR); Benoit Durand-Gasselin, Clermont-Ferrand (FR); Serge Lefebvre, Clermont-Ferrand (FR); Mathieu Vandaele, Clermont-Ferrand (FR); Kazutaka Yokokawa, Clermont-Ferrand (FR)

(73) Assignees: Compagnie Generale Des Etablissements Michelin, Clermont-Ferrand (FR); Michelin Recherche Et Technique, S.A., Granges-Paccot (FR)

( * ) Notice: Subject to any disclaimer, the term of this patent is extended or adjusted under 35 U.S.C. 154(b) by 0 days.

(21) Appl. No.: 15/034,451

(22) PCT Filed: Nov. 5, 2014

(86) PCT No.: PCT/EP2014/073789
§ 371 (c)(1),
(2) Date: May 4, 2016

(87) PCT Pub. No.: WO2015/067642
PCT Pub. Date: May 14, 2015

(65) Prior Publication Data
US 2016/0297253 A1 Oct. 13, 2016

(30) Foreign Application Priority Data
Nov. 5, 2013 (FR) ...................... 13 60822

(51) Int. Cl.
B60C 11/12 (2006.01)
B60C 11/03 (2006.01)

(52) U.S. Cl.
CPC ........ B60C 11/1204 (2013.01); B60C 11/033 (2013.01); B60C 11/0332 (2013.01);
(Continued)

(58) Field of Classification Search
CPC . B60C 11/04; B60C 11/1204; B60C 11/1213; B60C 11/1281; B60C 11/12;
(Continued)

(56) References Cited

U.S. PATENT DOCUMENTS 2,821,231 A    1/1958  Kraft
4,230,512 A *  10/1980 Makino .............. B60C 11/0306
                                                152/209.21
(Continued)

FOREIGN PATENT DOCUMENTS

DE    4018463 A1    12/1990
EP    0369932       5/1990
(Continued)

Primary Examiner — Jodi C Franklin
(74) Attorney, Agent, or Firm — Dickinson Wright PLLC

(57) ABSTRACT

The aspects disclosed herein relate to a tread for a tire including at least one block of rubbery material of width W and length L with L»W. This block extends in a circumferential direction (X) when the tread is mounted on the tire, the block including a contact surface intended to come into contact with the ground and a first lateral wall and a second lateral wall delimiting this contact surface. The block further includes a plurality of sipes opening onto the contact surface of the block, with each sipe extending over the contact surface in an oblique direction opening onto the first lateral wall and onto the second lateral wall, the sipes of the block being oriented in the same direction. The sipes are distributed over the contact surface of the block in such a way that when one sipe reaches the second lateral wall another sipe (Continued)

starts out from the first lateral wall at the same circumferential level (N) on the block, and each sipe includes at least two parts.

12 Claims, 4 Drawing Sheets

(52) U.S. Cl.
CPC .......... *B60C 11/12* (2013.01); *B60C 11/1236* (2013.01); *B60C 11/1281* (2013.01); *B60C 2011/0334* (2013.01); *B60C 2011/1209* (2013.01); *B60C 2011/129* (2013.01); *B60C 2011/1213* (2013.01); *B60C 2011/1227* (2013.01)

(58) Field of Classification Search
CPC ..... B60C 2011/1209; B60C 2011/1213; B60C 11/0306
See application file for complete search history.

(56) References Cited

U.S. PATENT DOCUMENTS

| | | | | |
|---|---|---|---|---|
| 4,926,919 | A * | 5/1990 | Hopkins | B60C 11/0306 152/209.22 |
| 5,795,415 | A * | 8/1998 | Campana | B60C 11/0309 152/209.18 |
| 6,968,881 | B2 * | 11/2005 | Ratliff, Jr. | B60C 11/0302 152/209.15 |
| 9,764,596 | B2 * | 9/2017 | Sanae | B60C 11/1204 |
| 2002/0053383 | A1 * | 5/2002 | Kleinhoff | B29C 33/301 152/209.18 |
| 2004/0256040 | A1 * | 12/2004 | Ratliff, Jr. | B60C 11/0306 152/209.18 |
| 2007/0151646 | A1 * | 7/2007 | Ito | B60C 11/0306 152/209.25 |
| 2009/0114325 | A1 * | 5/2009 | Ishizaka | B60C 9/2006 152/209.26 |
| 2010/0154951 | A1 * | 6/2010 | Honbou | B60C 11/0306 152/209.18 |
| 2010/0218867 | A1 * | 9/2010 | Matsumoto | B60C 11/12 152/209.18 |
| 2011/0005652 | A1 * | 1/2011 | Ono | B60C 11/0309 152/209.18 |
| 2012/0168049 | A1 * | 7/2012 | Jenkins | B60C 11/12 152/209.21 |
| 2013/0014870 | A1 * | 1/2013 | Georges | B60C 11/12 152/209.18 |
| 2013/0014871 | A1 * | 1/2013 | Georges | B60C 11/04 152/209.18 |
| 2013/0061992 | A1 | 3/2013 | Mathonet et al. | |
| 2013/0098519 | A1 * | 4/2013 | Maehara | B60C 11/0306 152/209.22 |
| 2013/0139937 | A1 * | 6/2013 | Gayton | B60C 11/0306 152/209.18 |
| 2013/0167998 | A1 * | 7/2013 | Kato | B60C 11/032 152/209.18 |
| 2013/0284335 | A1 * | 10/2013 | Rolland | B60C 11/03 152/209.25 |
| 2014/0014245 | A1 * | 1/2014 | Bonhomme | B60C 11/04 152/209.18 |
| 2014/0053962 | A1 * | 2/2014 | Lhospitalier | B60C 11/0306 152/209.18 |
| 2014/0326381 | A1 * | 11/2014 | Hamanaka | B60C 9/2006 152/209.18 |
| 2015/0210121 | A1 * | 7/2015 | Sanae | B60C 11/1204 152/209.8 |
| 2015/0352903 | A1 * | 12/2015 | Ookawa | B60C 11/0306 152/209.18 |
| 2015/0360516 | A1 * | 12/2015 | Mori | B60C 9/2006 152/535 |

FOREIGN PATENT DOCUMENTS

| | | |
|---|---|---|
| FR | 759592 | 2/1934 |
| FR | 43383 | 5/1934 |
| JP | H05286311 | 11/1993 |
| WO | 2007099084 | 9/2007 |

* cited by examiner

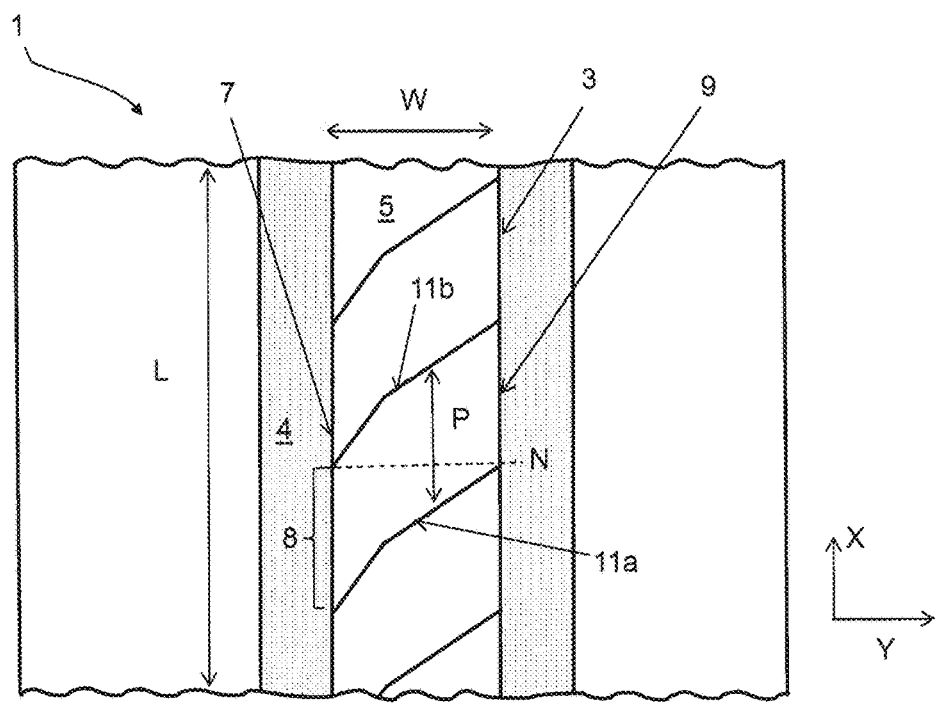
Fig.1
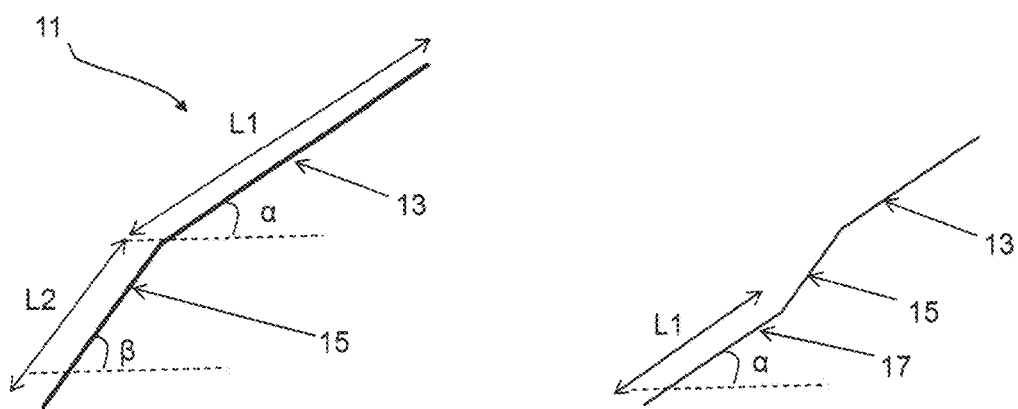
Fig.2  Fig. 3

US 10,414,212 B2

TREAD COMPRISING A BLOCK HAVING A PLURALITY OF SIPES

This application is a 371 national phase entry of PCT/EP2014/073789 filed, 5 Nov. 2014, which claims the benefit of French Patent Application No. 1360822, filed 5 Nov. 2013, the contents of which are incorporated herein by all reference for all purposes.

BACKGROUND

The present disclosure relates to a tread of a tire for a motor vehicle comprising a block of rubbery material, the length of which is very much greater than its width, and more particularly the disclosure relates to a tread comprising a block having a plurality of sipes.

Document FR759592 discloses the use of sipes in a tire tread for increasing the grip of this tire. Specifically, the use of sipes makes it possible to increase the number of edge corners on the tread surface of the tread thereby notably encouraging grip on wet ground. A sipe means a cut in the tread delimiting walls of material, the width of this cut being suitable for allowing these walls of material to come at least partially into contact as they enter the contact patch in which the tire is in contact with the ground. The width of a sipe is at most equal to 2 millimetres (mm).

Document FR43383 which is an addition to document FR759592 discloses the use of oblique sipes. The oblique sipes delimit sub-blocks of rubbery material. The resistance of these sub-blocks to wear varies according to the width of these sub-blocks, namely according to the distance between two adjacent oblique sipes. Furthermore, the use of oblique sipes in the tread may lead to additional running noise.

There is therefore a need to offer a tread which, over all or part of this tread, has a plurality of oblique sipes that are distributed in such a way as to optimize the resistance of this tread to wear while at the same time limiting the risks of generating running noise.

A "tire" means all types of resilient tread whether or not it is subjected to an internal pressure.

The "tread" of a tire means a quantity of rubbery material delimited by lateral surfaces and by two main surfaces, one of which is intended to come into contact with the ground during driving.

A tread "block" means a raised element delimited by grooves and comprising lateral walls and a contact face, the latter being intended to come into contact with the ground during running.

A "groove" means a cut in the tire delimiting walls of material, the width of this cut being such that the walls associated with this cut cannot come into contact with one another under normal running conditions. The width of a groove is greater than 2 millimetres.

A "sipe" means a cut in the tread delimiting walls of material, the width of this cut being suited to allowing the walls of the sipe to come at least partially into contact as they pass through the contact patch in which the tire is in contact with the ground. The width of a sipe is less than or equal to 2 millimetres.

The "axial direction" means a direction parallel to the axis of rotation of the tire.

A "circumferential direction" means a direction tangential to any circle centred on the axis of rotation. This direction is perpendicular to the axial direction.

An "oblique direction" means a direction that has an axial component and a circumferential component neither of which is zero.

SUMMARY

The disclosure relates to a tread for a tire comprising at least one block of rubbery material of width W and length L with L»W. This block extends in a circumferential direction (X) when the tread is mounted on the tire. The block comprises a contact surface intended to come into contact with the ground and a first lateral wall and a second lateral wall delimiting this contact surface. The block further comprises a plurality of sipes opening onto the contact surface of the block, each sipe extending over the contact surface in an oblique direction opening onto the first lateral wall and onto the second lateral wall, the sipes of the block being oriented in the same direction. The sipes are distributed over the contact surface of the block in such a way that when one sipe reaches the second lateral wall, another sipe starts out from the first lateral wall at the same circumferential level on the block. Each sipe comprises at least one first sipe part and a second sipe part, the first sipe part having, in a transverse direction, a length $L_1$ making an angle $\alpha$ with this transverse direction and the second sipe part having a length $L_2$ making an angle $\beta$, with $L_1 > L_2$ and $\beta > \alpha$.

The disclosure thus proposes to maintain a certain distance between two adjacent sipes, so that the width of a sub-block delimited by these two sipes is great enough to give it good rigidity. This then limits the risks of the sub-blocks chunking during running.

The disclosure also proposes organizing the sipes in such a way that when the sipes are projected in the circumferential direction, these sipes have a limited overlap. Each oblique sipe contributes to the grip performance of the tire notably when braking under cornering on wet ground. If oblique sipes overlap in the circumferential direction, the braking load would be reacted by these two sipes in their region of overlap. The wear of the sub-blocks associated with these two sipes is therefore altered in this region of overlap because the braking load is spread between these two sub-blocks. By contrast, in regions where there is no overlap, one single oblique sipe reacts all of these loads. Sub-block wear therefore varies according to whether or not the associated oblique sipes overlap other oblique sipes. By planning to limit the overlapping of the oblique sipes it is possible to ensure that sub-block wear within the block is uniform overall. This then improves the durability of the tire.

In addition, the aspects disclosed herein rely on a discovery that an uninterrupted succession of sipes in the length of the block, the noise generated by the tread on the ground is limited overall.

Finally, by proposing complex sipes comprising parts of different lengths and at different angles, the sub-blocks of the block are given certain multi-functionality in controlling grip on wet ground both under cornering and in a straight line.

In one alternative, the angle $\alpha$ is greater than 0° and less than 40°.

This then ensures that the sub-blocks exhibit good braking performance in a straight line on a wet roadway.

In another alternative, the angle $\beta$ is greater than or equal to 65° and less than or equal to 90°.

This then ensures that the sub-blocks exhibit good grip performance under cornering on a wet roadway.

In another alternative form of embodiment, each sipe comprises a third part having the same length $L_1$ and the same angle α as the first part, the first part and the third part being positioned one on each side of the second part of the sipe.

Tire grip on wet ground is thus assured, irrespective of which way round the tire is mounted.

In another alternative, the length L1 is greater than or equal to 35% of the width W of the block 3.

This further improves tire grip on wet ground, both under cornering and in a straight line.

In another alternative, with the first sipe part having a width W1 and the second sipe part having a width W2, the width W2 of the second sipe part is determined as a function of the width W1, of the angle α, of the angle β, so that the area A1 formed by the intersection between this second part and a plane P extending in the transverse direction and perpendicular to the tread is identical overall to the area A2 formed by this plane P at the first sipe part.

In this way it is possible to ensure that the variations in void volume, along the length of the block, are limited. This then improves the performance of the tire in terms of noise.

In another alternative, all or some of the dimensions of the sipes vary along the length L of the block.

The sipes form part of a set of patterns which constitutes the tread pattern of the tread. It is known practice to provide patterns of different sizes in order to scramble the noise signal emitted by the tread pattern of the tire and thus decrease the noticeable features of the tread pattern noise spectrum. By varying the dimensions of the sipes it is possible to adapt the characteristics of these sipes to suit the size of the patterns in which they are inscribed.

In one preferred embodiment, the angle β of the second sipe part varies along the length L of the block.

This is better for braking in a straight line on wet ground.

In another preferred embodiment, the length L2 of the second sipe part varies along the length L of the block.

This is better for grip under cornering on wet ground.

In another embodiment, the sipes have, between each sipe part, a fillet radius of between 0.4 mm and 5 mm.

In this way, the generation of cracks at the connections between the sipe parts is limited.

In another embodiment, the sipes are partially or fully chamfered on the contact surface of the block.

This then improves the performance of the tire under braking and under cornering on dry ground.

BRIEF DESCRIPTION OF THE DRAWINGS

Other features and advantages of the invention will become apparent from the following description, given by way of nonlimiting example, with reference to the attached drawings in which:

FIG. 1 schematically depicts a partial view of a tread according to a first embodiment;

FIG. 2 schematically depicts an enlarged view of a sipe of the block of FIG. 1;

FIG. 3 schematically depicts an alternative form of embodiment of the sipe of FIG. 1, according to a second embodiment;

Figure 4:
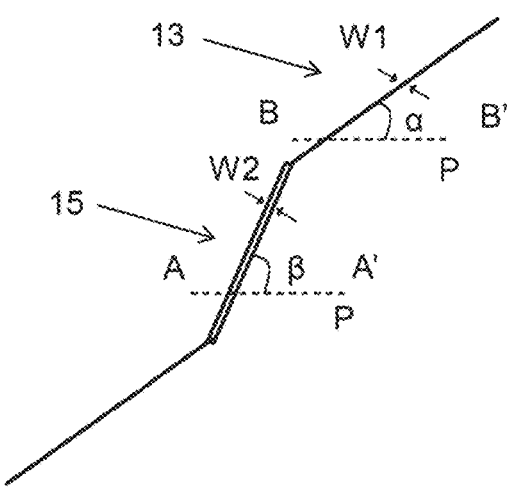
FIG. 4 schematically depicts an alternative form of embodiment of the sipe of FIG. 1, according to a third embodiment.

In the description which follows, elements which are substantially identical or similar will be denoted by identical references.

DETAILED DESCRIPTION

FIG. 1 is a partial view of a tread 1 of a tire according to a first embodiment.

The tread 1 includes at least one block 3 of rubbery material. The block 3 here is delimited by two grooves 4 which have been shaded grey in FIG. 1 to make the invention easier to understand. More specifically, the block 3 has a width W and a length L, this length L being very much greater than the width W. By "very much greater" it is meant that the length L is at least equal to 5 times the width W. In this way, when the tread 1 is mounted on a tire, the block 3 gives an appearance of a strip extending in a circumferential direction X. This strip may extend all around the circumference of the tire. As an alternative, this strip extends over only part of this circumference.

In addition, the block 3 includes a contact surface 5 intended to come into contact with the ground and a first lateral wall 7 and a second lateral wall 9 delimiting this contact surface 5. Furthermore, the block 3 includes a plurality of sipes 11, 11a, 11b, opening onto the contact surface 5. Each sipe extends in an oblique direction opening onto the first lateral wall 7 and onto the second lateral wall 9. The sipes of the block are, in this instance, oriented in the same direction, namely the sipes extend from the first lateral wall 7 towards the second lateral wall 9 in a direction that is positive in X and Y. These sipes are distributed over the contact surface 5 of the block 3 in such a way that when one sipe 11a reaches the second lateral wall 9, another sipe 11b starts out from the first lateral wall 7, at the same level N on the block 3. What is meant by "at the same level N" on the block is a determined circumferential position on this block. Furthermore, "at the same level" means that there may be a slight offset between the circumferential position of the sipes 11a, 11b. This offset is, however, limited. It is preferably less than 5% of the pitch P of the sub-block 8 delimited by the two sipes 11a and 11b. In order to assess whether or not such an offset is present, use is made of the idea of a neutral axis associated with each sipe. In addition, each sipe 11 comprises at least a first sipe part 13 and a second sipe part 15, the first sipe part 13 having, in a transverse direction, a length L1 that makes an angle α with this transverse direction and the second sipe part 15 having a length L2 making an angle β, with L1>L2 and β>α.

As may be seen in FIG. 2, the angle α is greater than 0° and less than 40°. Likewise, the angle β is greater than or equal to 65° and less than or equal to 90°.

FIG. 3 depicts an alternative form of embodiment in which each sipe includes a third part 17 having the same length L1 and the same angle α as the first part 13, the first part 13 and the third part 17 being positioned one on each side of the second part 15 of the sipe 11. For preference, the length L1 is greater than or equal to 35% of the width W of the block 3.

Figure 5:
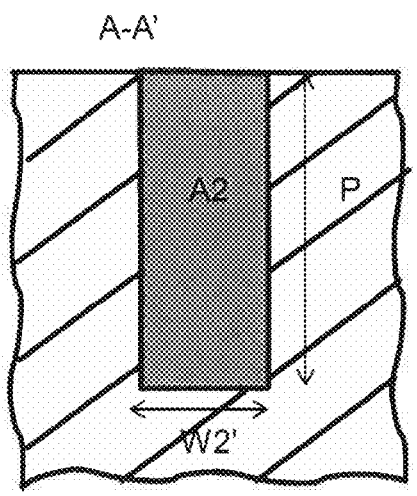
FIG. 5 is a view in section on A-A' of part of the sipe of FIG. 4.
Figure 6:
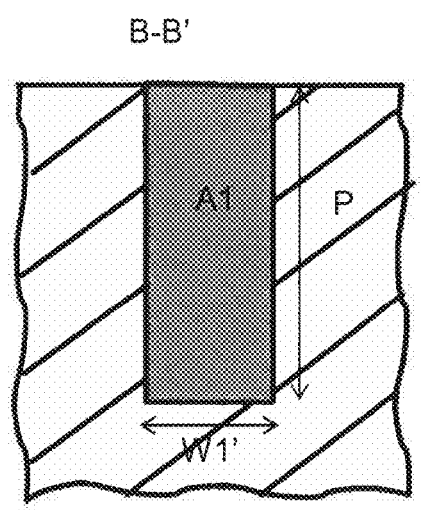
FIG. 6 is a view in section on B-B' of part of the sipe of FIG. 4.

In a preferred embodiment visible in FIGS. 4 to 6, the first sipe part 13 has a width W1 and the second sipe part 15 has a width W2. The width W2 of the second sipe part is determined as a function of the width W1, of the angle α, of the angle β, so that the area A2 formed by the intersection between this second part 15 and a plane P extending in the transverse direction Y and perpendicular to the tread 1 is identical to the area A1 formed by this plane P at the first sipe part 13.

More specifically, the area A2 corresponds to the product of the width W2' and the depth P of the sipe, as can be seen in FIG. 5, and W2'=W2/(sin(β)). Likewise, the area A1 corresponds to the product of the width W1' and the depth P of the sipe, as can be seen in FIG. 6, et W1'=W1/sin(α). Because of the identity between the area A1 and the area A2, it can be deduced from this that W2=W1*sin(β)/sin(α). Given that β is greater than α, it can also be deduced from this that W2 is greater than W1.

In an alternative, the area A1 is equal overall to the area A2, which means to say that the area A1 is equivalent to +/−10% of the area A2.

Figure 7:
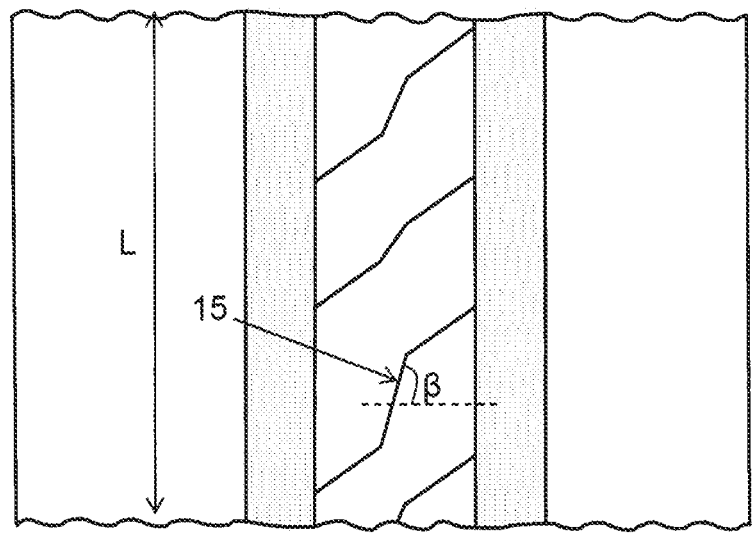
FIG. 7 schematically depicts an alternative form of embodiment of the sipe of FIG. 1, according to a fourth embodiment.
Figure 8:
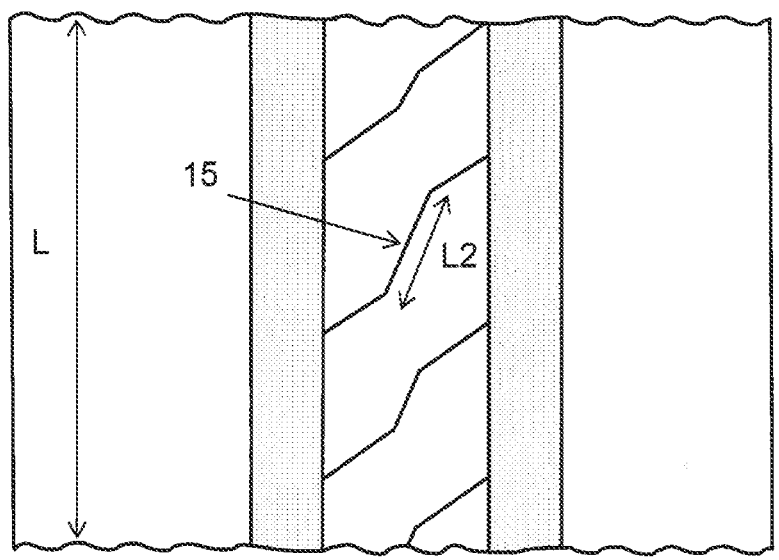
FIG. 8 schematically depicts an alternative form of embodiment of the sipe of FIG. 1, according to a fifth embodiment.

FIGS. 7 and 8 depict alternative forms of embodiment in which all or part of the sipes 11 vary along the length L of the block 3. Thus, in FIG. 7, it is the angle β of the second sipe part 15 that varies along the length L of the block 3. In FIG. 8, it is the length L2 of the second sipe part 15 that varies along the length L of the block 3.

Figure 9:
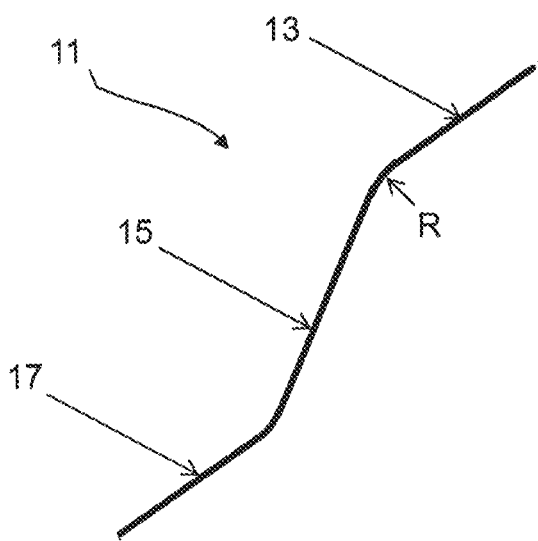
FIG. 9 schematically depicts an alternative form of embodiment of the sipe of FIG. 1, according to a sixth embodiment.

In an alternative form of embodiment visible in FIG. 9, the sipes 11 have, between each sipe part 13, 15, 17, a fillet radius R of between 0.4 mm and 5 mm.

Figure 10:
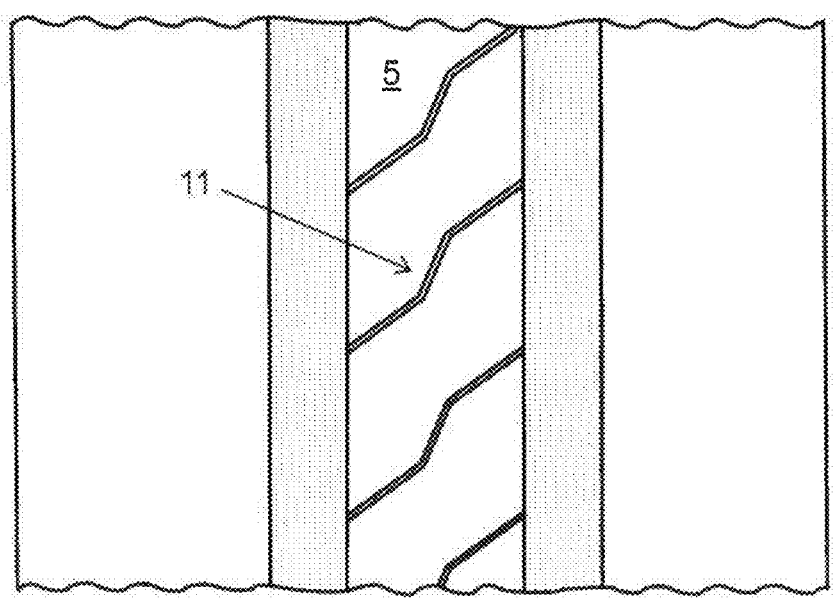
FIG. 10 schematically depicts an alternative form of embodiment of the sipe of FIG. 1, according to a seventh embodiment.

In another alternative form of embodiment visible in FIG. 10, the sipes 11 are partially or completely chamfered at the contact surface 5 of the block 3.

The aspects disclosed herein are not restricted to the examples described and depicted and various modifications can be made thereto without departing from its scope.

The invention claimed is:

1. Tread for a tire, comprising:
at least one block of rubbery material of width W and length L with L»W, the at least one block extending in a circumferential direction (X) when the tread is mounted on the tire,
the at least one block comprising a contact surface that contacts with the ground and a first lateral wall and a second lateral wall delimiting the contact surface,
the at least one block further comprising a plurality of sipes opening onto the contact surface of the at least one block, each sipe extending over the contact surface in an oblique direction opening onto the first lateral wall and onto the second lateral wall, the sipes of the at least one block being oriented in the same direction, wherein each of the sipes are distributed over the contact surface of the at least one block in such a way that when one sipe reaches the second lateral wall, another sipe starts out from the first lateral wall at a same circumferential level on the at least one block (3), and
in that each sipe comprises a first sipe part extending in the circumferential direction (X) from the first lateral wall to a first sipe part end and a second sipe part extending in the circumferential (X) direction from the first sipe part end to the second lateral wall, the first sipe part of each sipe having, in a transverse direction, a length L1 making an angle α with this transverse direction and the second sipe part of each sipe having a length L2 making an angle β with the transverse direction, with L1>L2 and β>α.

2. Tread according to claim 1, wherein the angle α is greater than 0° and less than 40°.

3. Tread according to either of claim 1, wherein the angle β is greater than or equal to 65° and less than or equal to 90°.

4. Tread according to claim 1, wherein the first sipe part has a width W1 and the second sipe part has a width W2, and the width W2 of the second sipe part is determined as a function of the width W1, of the angle α, of the angle β, so that the area A2 formed by the intersection between this second part and a plane P extending in the transverse direction (Y) and perpendicular to the tread is identical overall to the area A1 formed by this plane P at the first sipe part.

5. Tread according to claim 1, wherein at least one of the length L1, the length L2, the angle α, or the angle β of each sipe of the plurality of sipes varies relative to the other sipes of the plurality of sipes along the length L of the respective at least one block.

6. Tread according to claim 5, wherein the angle β of the second sipe part of each sipe of the plurality of sipes varies relative to the other sipes of the plurality of sipes along the length L of the respective at least one block.

7. Tread according to claim 5, wherein the length L2 of the second sipe part of each sipe of the plurality of sipes varies relative to the other sipes of the plurality of sipes along the length L of the respective at least one block.

8. Tread according claim 1, wherein the sipes have, between each sipe part, a fillet radius R of between 0.4 mm and 5 mm.

9. Tread according claim 8, wherein the sipes are partially or fully chamfered on the contact surface of the at least one block.

10. Tread according to claim 1, wherein all of the length L1, the length L2, the angle α, and the angle β of each sipe of the plurality of sipes varies relative to the other sipes of the plurality of sipes along the length L of the respective at least one block.

11. Tread for a tire, comprising
at least one block of rubbery material of width W and length L with L»W, the at least one block extending in a circumferential direction (X) when the tread is mounted on the tire,
the at least one block comprising a contact surface that contacts with the ground and a first lateral wall and a second lateral wall delimiting the contact surface,
the at least one block further comprising a plurality of sipes opening onto the contact surface of the at least one block, each sipe extending over the contact surface in an oblique direction opening onto the first lateral wall and onto the second lateral wall, the sipes of the at least one block being oriented in the same direction, wherein each of the sipes are distributed over the contact surface of the at least one block in such a way that when one sipe reaches the second lateral wall, another sipe starts out from the first lateral wall at a same circumferential level on the at least one block (3),
wherein each of the sipes comprises a first sipe part extending from the first lateral wall and a third part extending from the second lateral wall, the first sipe part of each sipe having, in a transverse direction, a length L1 making an angle a with this transverse direction, and the third sipe part of each sipe having the same length L1 and the same angle a as the first part, and a second sipe part extending between the first and third sipe parts and having a length L2 making an angle β, with L1>L2 and β>α.

12. Tread according to claim 11, wherein the length L1 is greater than or equal to 35% of the width W of the block.

\* \* \* \* \*